(12) United States Patent
Macli et al.

(10) Patent No.: US 7,632,102 B2
(45) Date of Patent: Dec. 15, 2009

(54) CLASSROOM INSTRUCTIONAL TOOL

(76) Inventors: Antonio Macli, 13499 Biscayne Blvd., Suite 203/205, Miami, FL (US) 33181; Mario Cantergiani, 13499 Biscayne Blvd., Suite 203/205, Miami, FL (US) 33181

( * ) Notice: Subject to any disclaimer, the term of this patent is extended or adjusted under 35 U.S.C. 154(b) by 393 days.

(21) Appl. No.: 11/781,733

(22) Filed: Jul. 23, 2007

(65) Prior Publication Data
US 2009/0029334 A1   Jan. 29, 2009

(51) Int. Cl.
*B43L 1/00*   (2006.01)
(52) U.S. Cl. .................................. 434/421; 434/408
(58) Field of Classification Search .............. 434/408, 434/413, 420, 421, 425, 428; 345/173
See application file for complete search history.

(56) References Cited

U.S. PATENT DOCUMENTS

| | | | | |
|---|---|---|---|---|
| 4,711,977 | A * | 12/1987 | Miyamori et al. ........ | 178/18.07 |
| 5,067,287 | A | 11/1991 | Lewis | |
| 5,305,114 | A | 4/1994 | Egashira et al. | |
| 5,501,603 | A * | 3/1996 | Mueller et al. ............ | 434/419 |
| 5,528,290 | A * | 6/1996 | Saund ..................... | 348/218.1 |
| 6,335,724 | B1 * | 1/2002 | Takekawa et al. .......... | 345/173 |
| 6,353,193 | B1 | 3/2002 | Atwood et al. | |
| 6,412,744 | B1 | 7/2002 | Wollam et al. | |
| 6,828,959 | B2 * | 12/2004 | Takekawa et al. .......... | 345/173 |
| 7,242,394 | B2 * | 7/2007 | Lahade et al. .............. | 345/173 |
| 7,450,109 | B2 * | 11/2008 | Halcrow et al. ............ | 345/173 |
| 2002/0008692 | A1 * | 1/2002 | Omura et al. ............... | 345/173 |
| 2002/0050985 | A1 * | 5/2002 | Takekawa et al. .......... | 345/173 |
| 2004/0263646 | A1 * | 12/2004 | Cutler ........................ | 348/239 |
| 2005/0078200 | A1 * | 4/2005 | Morichika ............ | 348/231.99 |
| 2006/0132467 | A1 * | 6/2006 | Saund et al. ................ | 345/178 |
| 2007/0024714 | A1 * | 2/2007 | Kim et al. .............. | 348/207.99 |

* cited by examiner

*Primary Examiner*—Kurt Fernstrom
(74) *Attorney, Agent, or Firm*—Craig Kirsch, Esq; Ruben Alcoba

(57) ABSTRACT

A classroom instructional tool allows an instructor to present a multimedia presentation on the tool while writing commentary on the same tool. The classroom instructional tool comprises of a front shell, a rear shell, attached to the front shell, a flat panel monitor attached to one of the sides of the rear shell, a computer housed within the other side of the rear shell, an internal whiteboard mounted on the front shell, an external whiteboard movably mounted on the front shell at a superior position than the internal whiteboard, and a camera attached to the rear shell at a position that is between one of the sides of the monitor and one of the sides of the rear shelf. The monitor, computer and the camera form a system of connectivity between them. The system of connectivity might be hardwired or wireless.

19 Claims, 3 Drawing Sheets

CLASSROOM INSTRUCTIONAL TOOL

BACKGROUND

The present invention is directed to a classroom instructional tool that allows an instructor to deliver interactive presentations using digital graphics displayed on a monitor of the tool while writing notes and commentary to the presentation on the whiteboards of the tool. The tool also allows third parties to monitor any activity within the room.

The inventors of the present invention realized that the present technology of flat display panels and computers now lend themselves to space saving in a learning environment. They remembered when they were young, that when lessons were presented to them using multimedia devices the multimedia devices typically had to be brought into their classrooms. Frequently, the devices were damaged by student's either transporting the devices to the rooms or placing the devices within a specific location within the room.

They realized they had to invent a multimedia device that would be in a centrally fixed location so that students receiving a lesson plan could all see the plan. The main problem with this concept is that typically, in classrooms or other learning environments, a blackboard is placed in the centrally fixed location. They needed a device that would replace the blackboard and allow instructors to simultaneously record notes or commentaries of multimedia presentations from the centrally fixed location.

The inventors then realized that the device they were inventing was prone to vandalism. They decided their invention, had to monitor any activity within its vicinity that could be monitored by third parties from an outside location. Then it hit them, the device would not only provide security to itself but it would also provide security to the occupants of the room. The device would serve as a first alarm to any suspicious activity within the learning environment, for the device would serve as a centrally located camera that would help monitor the room.

Information relevant to attempts to address these problems can be found in U.S. Pat. Nos. 5,067,287, 6,412,744, 5,305,114 and 6,353,193. However, each one of these references suffers from one or more of the following disadvantages; foe inventions do not provide a device that can present a multimedia presentation to an audience while allowing an instructor to write commentary of the presentation on a whiteboard of the same device; and they do not provide the monitoring aspects of the present invention.

An object of the present invention is to provide a multimedia device that is fixed within a room.

Another object of the present invention is to provide a device that can conserve space within a classroom.

A further object of the present invention is to provide an instructor with a device that is interactive.

Yet another object of the present invention is to provide a classroom with a device that can be used to communicate with third panics outside of its fixed location.

Another object of the present invention is to provide a device for an instructor to write on while presenting a multimedia presentation on the device.

Another object of the present invention is to provide a device that can be used to monitor a room.

SUMMARY

The present invention is directed to a classroom instructional tool that satisfies the need for allowing an instructor to present a multimedia presentation on the tool while writing commentaries on the same tool. The classroom instructional tool comprises of a front shell, a rear shell, a flat panel monitor attached to one of the sides of the rear shell, a computer housed within the other side of the rear shell, an internal whiteboard mounted on the rear shell, an external whiteboard movably mounted on the front shell at a superior position from that of the internal whiteboard, and a camera attached to the rear shell at a position that is between one of the sides of the monitor and one of the sides of the rear shell. The monitor, computer and the camera form a system of connectivity between them. The system of connectivity might be hardwired or wireless.

In another embodiment of the present invention, a wireless communication interface is housed within the shells and is connected to the computer.

In another embodiment of the present invention, a microphone might be housed within the shells.

The monitor of the present invention might be a touch screen interlace in which lesson plans or the internet might be directly accessed.

The present invention might be used to facilitate live long distance learning between an instructor and students.

The present invention might also be used as a training tool in corporate environments. It is foreseen that large multinationals will be able to train their personnel using the present invention from one fixed location broadcasting to many locations.

DRAWINGS

These and other features, aspects, and advantages of the present invention will become better understood with regard to the following description, appended claims, and drawings where:

DESCRIPTION

Figure 1:
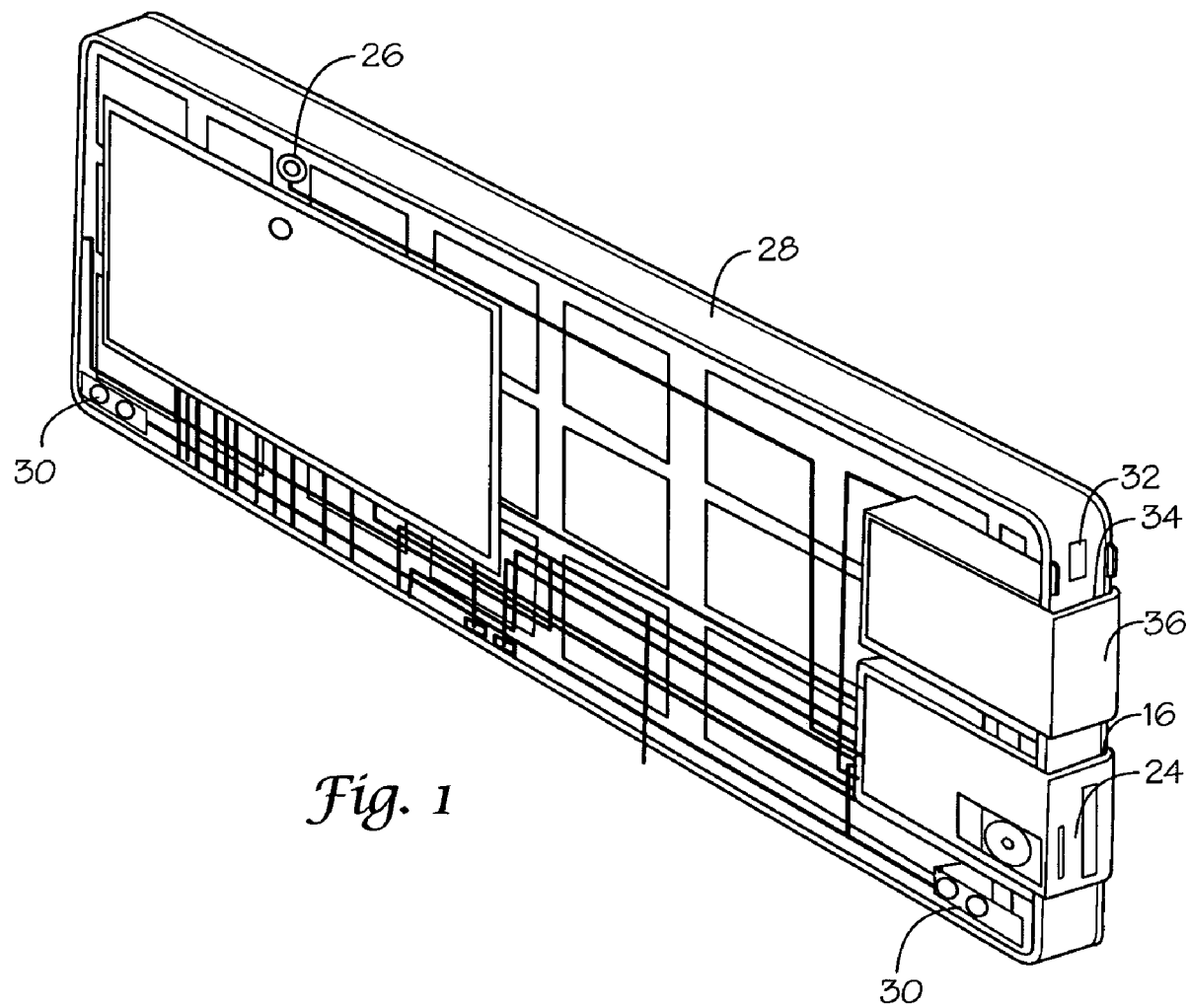
FIG. 1 shows a perspective view of a classroom instructional tool, the view shows the monitor, a computer, a speaker system, a camera, a communication interlace, and a storage compartment attached to a rear shell.
Figure 2:
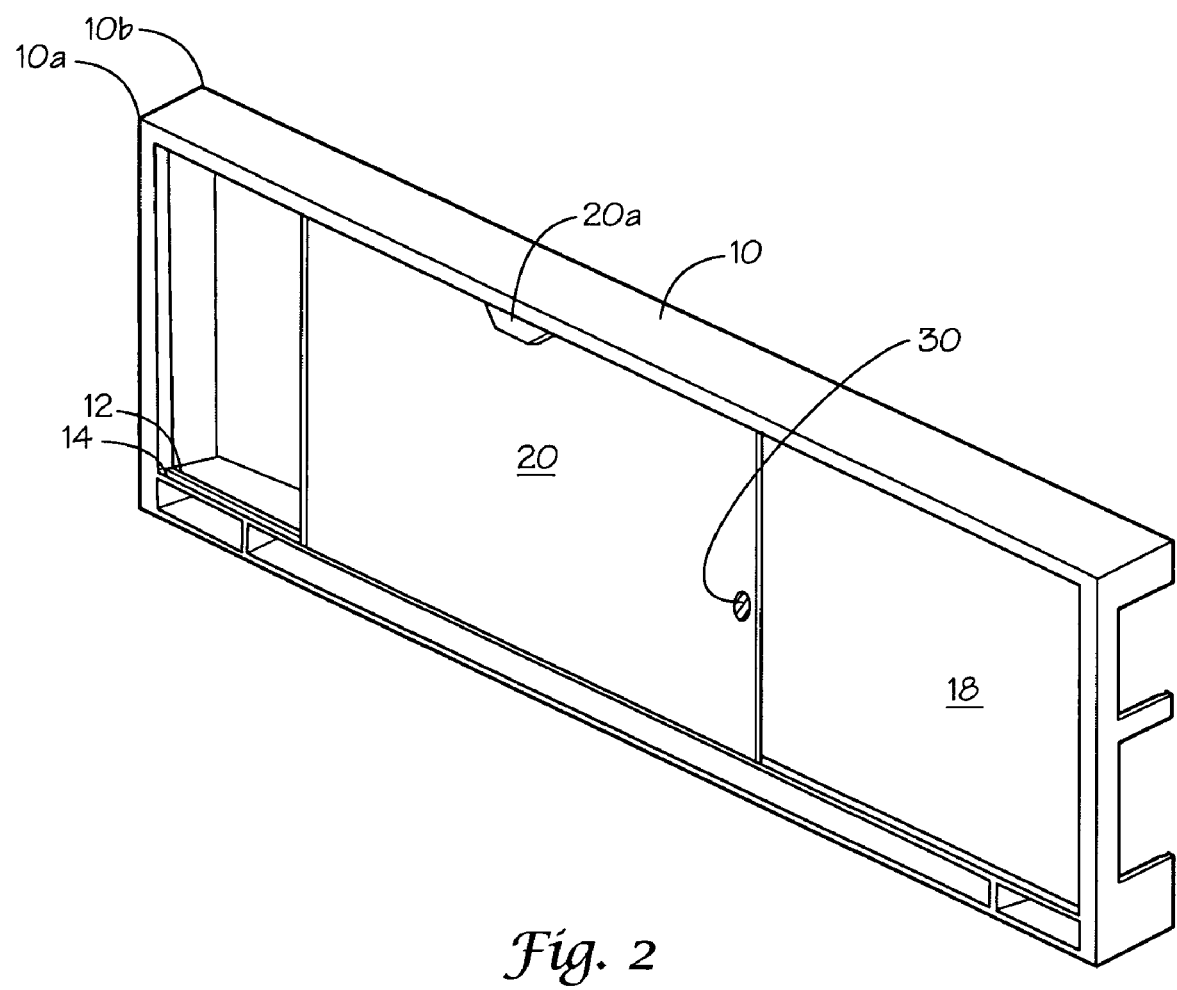
FIG. 2 shows a perspective view of the front shell of the classroom instructional tool of FIG. 1 the view shows the whiteboards attached to the front shell.
Figure 3:
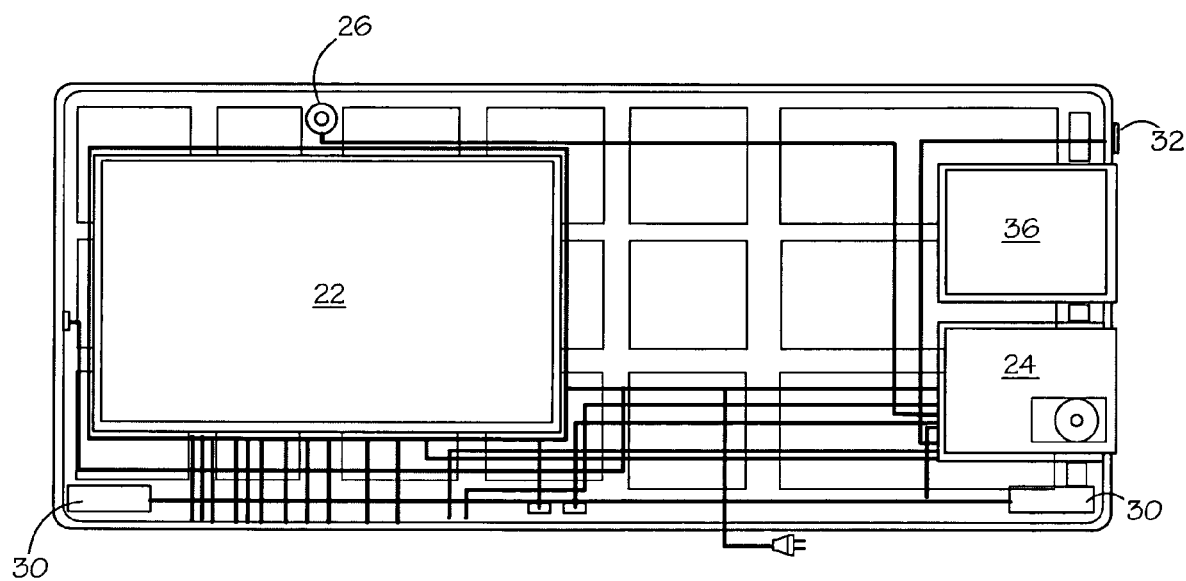
FIG. 3 shows a front view of the rear shell of FIG. 1, the view shows how the internal components might be attached to the rear shell.

As seen in FIGS. 1-3, a classroom instructional tool comprises a rectangular front shell 10, the front shell 10 having a front 10a, a back 10b, a right, a left, atop and a bottom side, the front shell 10 defining a first 12 and a second rail 14 system adjacent to the front side 10a and within the front shell 10, the first 12 and second rail 14 system running parallel to each other, the first rail system 12 being closer to the front side 10a of the front shell, the front shell 10 further defining a first left or right side opening 16. An internal rectangular whiteboard 18 mounted on the second rail system 14. An external rectangular sliding whiteboard 20 mounted on the first rail system 12, the external whiteboard 20 might define a second camera window 20b. A rectangular rear shell 28 having a left and a right side attached to the front shell 10, the rear shell 28 having a plurality of openings. A flat panel monitor 22, having a top and a bottom side, fixedly attached to the rear shell 28 at a position that is either adjacent to the left or right side of the rear shell 28. A computer 24 housed within the rear shell 28 at a position that is adjacent to the side of the rear shell 28 not attached to the monitor 22, the computer 24 is placed within the first side opening 16 and attached to the rear shell 28, the computer 24 is further connected to the monitor 22. And, a camera 26 fixedly attached to the rear shell 28 between one of the monitor's sides 22 and either the top or bottom side of the rear shell 28, the camera 26 being connected to the computer 24.

In another embodiment of the present invention, the tool might further comprise of a speaker system 30 attached to the rear 28 shell, the speaker system 30 is connected to the computer 24.

In another embodiment of the present invention, the tool might further comprise of a wireless communication interface 32 attached to the rear 28 shell, the communication interlace 12 being connected to the computer 24.

In another embodiment of the present invention, the tool's left or right side of the rectangular from shell 10 further defines a second left or right side opening 34, the tool further comprises of a storage compartment 36 placed within the second opening 34, the storage compartment 34 attaches to the rear shell 28.

The monitor 22 of the present invention might be a touch screen interface. The monitor 22 might have either an LCD or a plasma display.

The camera 26 of the present invention might also house a microphone.

In another embodiment of the present invention, the internal 18 and external 20 whiteboards might have a means for locking 38 the internal 18 and external 20 whiteboards to the front shell 10.

A method of using the classroom instructional tool might comprise the steps of first installing the tool in a classroom, then powering the components of the tool then delivering a lesson to an audience. The method might further comprise of transmitting the lesson plan to an outside source, receiving feedback from an outside source and transmitting a response to the feedback to the outside source. It is foreseeable that multinational corporations will use the method of transmitting information to train their personnel.

It is foreseeable that the classroom instructional tool might be used by school security to monitor events in a classroom. A method of using the tool to monitor a classroom might comprise the steps of installing the tool in the classroom, then powering the tool, then recording any activity in the room via the camera and the computer of the tool, and lastly transmitting a signal of the recorded activity from the computer to an outside source.

An advantage of the present invention is that it provides a multimedia device that is fixed within a room.

Another advantage of the present invention is that it provides a device that can conserve space within a classroom.

A further advantage of the present invention is that it provides an instructor with a device that is interactive.

Yet another advantage of the present invention is that it provides a classroom with a device that can be used to communicate with third parties outside of its fixed location.

Another advantage of the present invention is that it provides a device for an instructor to write on while presenting a multimedia presentation on the device.

Another advantage of the present invention is that it provides a device that can be used to monitor a room.

Although the present invention has been described in considerable detail with reference to certain preferred versions thereof, other versions are possible. Therefore the spirit and the scope of the claims should not be limited to the description of the preferred versions contained herein.

What is claimed is:

1. A classroom instructional tool comprising:
   a rectangular front shell, the front shell having a front, a back, a right, a left, a top and a bottom side, the front shell defining a first and a second rail system adjacent to the front side and within the front shell, the first and second rail system running parallel to each other, the first rail system being closer to the front side of the front shell, the front shell further defining a first left or right side opening;
   an internal rectangular whiteboard mounted on the second rail system;
   an external rectangular sliding whiteboard mounted on the first rail system, the external whiteboard defines a camera window;
   a rectangular rear shell having a left, right, top, and bottom side attached to the front shell the rear shell having a plurality of openings;
   a flat panel monitor, having a top and a bottom side, fixedly attached to the rear shell at a position that is either adjacent to the left or right side of the rear shell;
   a computer housed within the rear shell at a position that is adjacent to the side of the rear shell riot attached to the monitor, the computer is further connected to the monitor; and
   a camera fixedly attached to the rear shell between one of the monitor's sides and either the top or bottom side of the rear shell the camera being connected to the computer.

2. The tool of claim 1, further comprising a speaker system housed within the rear shell, the speaker system being connected to the computer.

3. The tool of claim 2, further comprising a wireless communication interlace housed within the rear shell, the communication interface being connected to the computer.

4. The tool of claim 3, wherein either the left or right side of the rectangular front shell further defines a second left or right side opening, the tool further comprises a storage compartment placed within the second opening, the storage compartment attaches to the rear shell.

5. The tool of claim 4, wherein the monitor is a touch screen interface.

6. The tool of claim 5, wherein the camera has a microphone.

7. The tool of claim 6, further comprising a means for locking the internal and external whiteboards in place.

8. The tool of claim 3, wherein the monitor is a touch screen interface.

9. The tool of claim 8, wherein the camera has a microphone.

10. The tool of claim 9, further comprising a means for locking the internal and external whiteboards in place.

11. The tool of claim 2, wherein the monitor is a touch screen interface.

12. The tool of claim 11, wherein the camera has a microphone.

13. The tool of claim 12, further comprising a means for locking the internal and external whiteboards in place.

14. The tool of claim 1, wherein the monitor is a touch screen interface.

15. The tool of claim 14, wherein the camera has a microphone.

16. The tool of claim 15, further comprising a means for locking the internal and external whiteboards in place.

17. A method of using the tool of claim 1 to monitor a classroom, comprising the steps of:
- installing the tool in a classroom;
- powering the tool;
- recording any activity in the room via the camera and the computer of the tool; and
- lastly transmitting a signal of the recorded activity from the computer to an outside source.

18. A method of using the tool of claim 1 to teach a class, comprising the steps of:
- installing the tool in a classroom;
- powering the components of the tool; and
- delivering a lesson to an audience.

19. The method of claim 18, further comprising the steps of:
- transmitting the lesson to an outside source;
- receiving feedback from the outside source; and
- transmitting a response to the feedback to the outside source.

* * * * *